June 4, 1963 LEV ABRAMOVICH GOOSSAK ETAL 3,092,088
CARBURETOR TYPE INTERNAL COMBUSTION ENGINE WITH PRECHAMBER
Filed Dec. 8, 1959
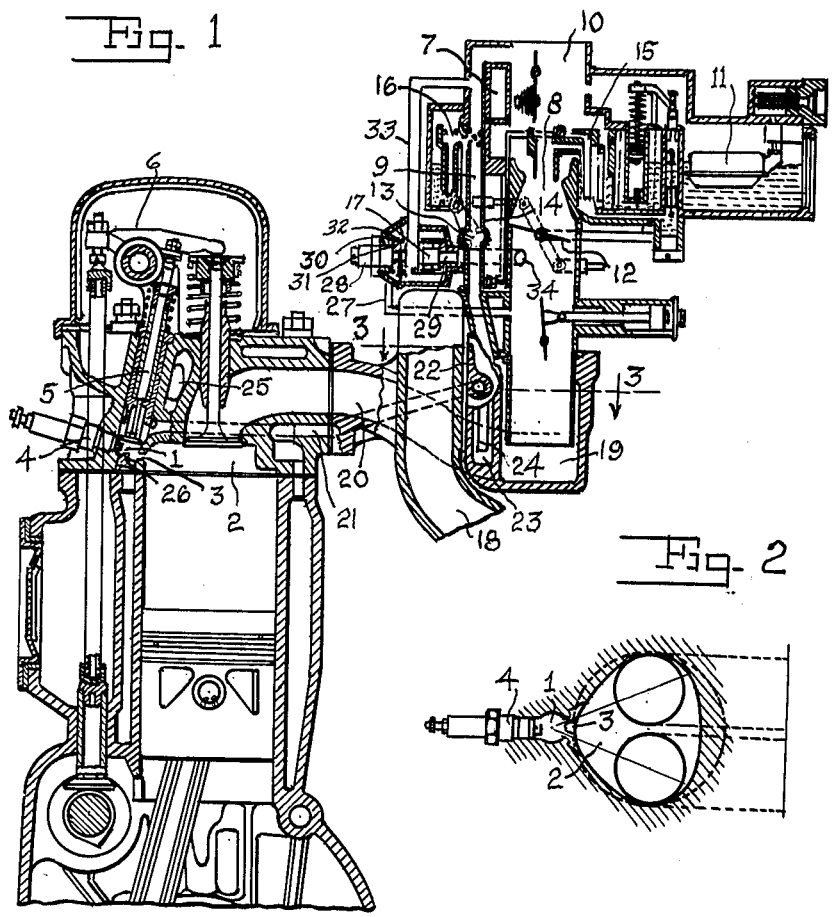
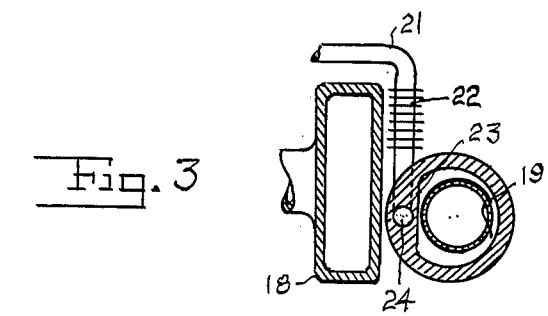

3,092,088
CARBURETOR TYPE INTERNAL COMBUSTION ENGINE WITH PRECHAMBER
Lev Abramovich Goossak, Naberejnaja Gorkovo 32/34, Apt. 49, Moscow; Garry Voldemarovich Evart, Prospekt Zhdanova 32, Apt. 65, Gorki; and Dmitrij Alexeevich Ribinsky, Opernaja ul. 25a, Apt. 4, Gorki; all of U.S.S.R.
Filed Dec. 8, 1959, Ser. No. 7,958
3 Claims. (Cl. 123—41.31)

This invention relates to carburetor type internal combustion engine with prechamber.

This invention is meant to improve the carburetor type internal combustion engine with prechamber. It provides for the ignition of a working mixture by a spray of active products obtained from incomplete burning of a rich auxiliary mixture in the prechamber, which ensures high anti-knock qualities, economical performance, and improved operating characteristics of the engine.

FIG. 1 illustrates a sectional view of a carburetor type prechamber engine.

FIG. 2 shows a cross-section through the combustion space and prechamber along the nozzle passages and spark plug.

FIG. 3 is a sectional view taken substantially on the line 3—3 of FIG. 1, and shows the fins for conducting heat from the exhaust manifold to the intake passage.

The small-volume prechamber 1, the volume of which is 2 or 3 percent of the main combustion space, is located adjacent to the main combustion chamber 2 and communicates with the latter through nozzle openings 3, which are arranged in a plane near the diametral plane of the engine cylinder, at an angle with respect to each other, and within an area opposite to the spark plug 4. The spark plug is installed in the prechamber behind a deflector cast integrally or consisting of a pressed-in part 26.

The prechamber intake valve 5 is actuated from the main intake valve mechanism, for instance, from the rocker arm 6.

The carburetor 7 comprises a main section 8 for supplying a fuel mixture to the combustion chamber 2 and a prechamber section 9 for supplying a fuel mixture to the prechamber 1, both being supplied with air from a common air pipe 10 and with fuel from a single float chamber 11. A main mixture throttle 12 and a prechamber mixture throttle valve 13, both of them located in the respective carburetor mixture passages, are interconnected by an adjustable link 14.

A system of air and fuel limiting jets 15 and 16 for the cylinder mixture and the prechamber mixture respectively are provided in the carburetor.

Under certain operating conditions, such as with the throttle closed and with the engine being driven by an external power source as would be the case in an automobile coasting downhill, a relatively high vacuum is induced in the main combustion chamber 2, the prechamber 1 and the intake manifold 19. As a result, oil may be drawn into the prechamber 1 and combustion chamber 2 through the clearances provided by the valve guide bushings on the intake valve. There also may be a tendency for oil to flow by the piston rings into combustion chamber 2. Such a condition results in excessive oil consumption and fouling of the spark plugs 4 installed in the prechambers 1 thereby impairing the operation of the engine and in order to avoid this difficulty it has been found desirable to provide a vacuum relief valve which may be installed in the carburetor 10 or in the intake manifold 19.

The vacuum relief valve may well comprise a valve member 17 slidably mounted in a body 30 and the valve member 17 is urged toward closed position by a compression spring 31, the operation of which may be determined by an adjusting screw 28. A diaphragm 32 is mounted on the valve member 17 and body 30 to provide a vacuum chamber communicating through a passage 27 with the intake manifold 19. An air passage 33 communicates with the valve body 30 and the air intake pipe 10 of the carburetor and a passage 29 in the valve member 17 serves to establish communication between the air passage 33 and through a passage 34 with the intake manifold 19 when the valve member 17 is in open position.

In operation, with the throttle valve 12 in closed position, a relatively high vacuum will be induced in the main combustion chamber 2 and intake manifold 19 and as a consequence, such relatively high vacuum will through the passage 27 reduce pressure on the diaphragm 32 thereby causing the valve member 17 to open and establish communication between the air passage 33 and the intake manifold 19 in order to reduce the vacuum present in the intake manifold 19, the main combustion chamber 2 and the prechamber 1. In this way, the vacuum relief valve will automatically maintain a proper degree of vacuum in the system to prevent excessive oil consumption and fouling of the spark plugs 4.

The main section 8 of the carburetor is connected to the main combustion chamber 2 by an intake manifold 19 and main mixture passages 20, which are separated from the exhaust manifold 18.

The prechamber section 9 of the carburetor communicates with the prechambers through other passages 21 for supplying the prechamber fuel mixture. The prechamber mixture pipes are provided with heat-absorbing fins 22 to preheat the rich air fuel mixture flowing to the prechamber and a well 23 with a tube 24, all of these being located near the hot surfaces of the exhaust manifold.

A water distribution pipe 25, located inside the engine cylinder head and connected to the water pump, ensures forced cooling of the cylinder head. The cylinder block is cooled by a gravity-circulation system, the water entering and leaving the cylinder head and block through a limited number of holes respectively.

The mixture enters the prechamber 1 under the effect of vacuum created in the cylinder during the suction stroke, simultaneously with the mixture feed to the main combustion chamber 2.

According to the proposed design, the prechamber 1 receives its fuel feed from two sources. During the suction stroke, when the prechamber inlet valve 5 opens almost simultaneously with the cylinder intake valve, the former admits under the effect of the vacuum in the cylinder an auxiliary mixture into the prechamber 1. This mixture has an air factor equal to $$a_2 = \frac{GB_2}{LT_2 GT_2}$$

where $GB_2$ and $GT_2$ denote the flow rates of air and fuel, respectively, passing through the prechamber section 9 of the carburetor, both either in weight or in volume units, and $LT_2$ the theoretical amount of air required for complete combustion of one (weight or volume) unit of fuel delivered into the prechamber 1. At the same time a working mixture charge is drawn to the cylinder 2, with an air factor of $$a_1 = \frac{GB_1}{LT_1 GT_1}$$

where $GB_1$ and $GT_1$ are the weight or volume flow rates of air and fuel, respectively, and $LT_1$ is the theoretical amount of air necessary for combustion of one weight or volume unit of fuel entering the cylinder 2. Both cylinder 2 and prechamber 1 being fed by the same fuel from the carburetor, $LT_1$ will be equal to $LT_2$ and can be taken approximately as $LT = 15$ kg. air per kg. of fuel.

Consequently, at the end of the suction stroke the cylinder 2 will be filled with a working mixture with an air factor of $a_1$, the amount of this mixture depending on the position of the throttle valve 12 and on the flow resistance of the engine intake system characterized by the volumetric efficiency factor ($2v$), while an auxiliary mixture having an air factor of $a_2$ flows through the prechamber 1. The amount of the auxiliary mixture likewise depends on the position of the throttle valve 13 and on the total flow resistance of the prechamber mixture duct system, prechamber valve 5, prechamber 1 and nozzle holes 3. It can be evaluated in the form of a prechamber scavenging factor $$K = \frac{GB_2}{GB_t}$$

where $GB_t$ is the amount of air per hour delivered into the the prechamber at $K=1$, i.e. without scavenging. With the throttles fully opened for operation at maximum load, the volumetric efficiency factor usually reaches $n_v = 0.8$ to 0.85 in carburetor engines, while the prechamber scavenging factor ($k$) should be at least 1.0 under such conditions. Achieving the latter presents some difficulties and requires a maximum reduction of flow resistance in the prechamber duct system.

When throttling is applied to the prechamber type carburetor engine, usually the gradual decrease in volumetric efficiency is accompanied by a considerable increase of scavenging, the scavenging factor becoming in some events as high as 8 or 10. As proved by experiments, such a high scavenging factor causes difficulties in adjusting the prechamber system and impairs the efficiency of the prechamber engine when the latter runs highly throttled. For this reason it is necessary to shut the throttle 13 in the prechamber section of the engine carburetor simultaneously with the throttle 12 in the cylinder section so as to limit the increasing of the scavenging factor to not greater than 4.0. Such a relation between the reduction of volumetric efficiency in the engine cylinder and the increase in the prechamber scavenging factor is effected with the help of a linkage which simultaneously moves the throttle valve in the cylinder section and the throttle valve in the prechamber section of the carburetor from the fully open to the fully closed position. Experimental work has also proved that throttling in the prechamber duct system contributes to more intensive evaporation, better mixing, and even distribution of the auxiliary mixture among the prechambers.

During the compression stroke the prechamber and cylinder inlet valves are closed, and the cylinder mixture is partly displaced from the main combustion chamber 2 into the prechamber 1. The initial volume of mixture having filled the prechamber during the intake ($V_t$) becomes E times less at the end of the compression stroke (E denotes the compression ratio), and occupies a volume equal to $$\frac{V_t}{E}$$

in the prechamber 1. The remaining folume of the prechamber, occupied by a part of the cylinder mixture, equals $$V_t - \frac{V_t}{E} = \frac{E-1}{E}V_t$$

If, for instance, $E = 7/1$, about 15 percent of the prechamber volume will at the end of the compression stroke be filled with a mixture sucked from the carburetor prechamber section during the intake stroke, and about 85 percent will be occupied by mixture coming from the carburetor cylinder section and forced into the prechamber during the compression stroke. Thus, the cylinder section of the carburetor is the basic one of both prechamber feed sources from the point of view of quantity feed control of the prechamber engine, since it provides the entire cylinder working mixture and most of the prechamber mixture.

As a result of the above effect, the prechamber contains at the moment of ignition a mixture having an air factor of $a_t$ and consisting of cylinder fuel mixture ($a_1$) occupying a volume of $$\frac{E-1}{E}V_t$$

and of prechamber mixture ($a_2$), the volume of which is $$\frac{1}{E}V_t$$

The air factor of the resulting mixture in the prechamber ($a_t$) can be calculated using the mixture proportion rule, according to which the average fuel concentration factor of the prechamber air ($C_t$) equals a sum of the particular mixture volumes ($Vi$) multiplied by their respective fuel concentration factors ($Ci$), divided by the summary mixture volume ($EVi$), or $$C_t = \frac{EViCi}{EVi}$$

Due to the fact that in our case only two types of mixture are being mixed together, the formula will be $$C_t = \frac{V_1 C_1 + V_2 C_2}{V_1 + V_2}$$

where $$C_t = \frac{GT_t}{GB_t}$$

is inversely proportional to the air factor of the resulting prechamber mixture $$\left(C_t = \frac{1}{a_t L_t}\right); V_1 = \frac{E-1}{E}$$

$V_t$ = volume of cylinder mixture displaced into the prechamber;

$C_1 = \dfrac{1}{a_1 L_T}$ = fuel concentration in the cylinder mixture air, inversely proportional to the air factor of this mixture portion;

$V_2 = \dfrac{1}{E}V_t$ = volume of mixture received from the prechamber section of the carburetor; and $C_2 = \dfrac{1}{a_2 L_T}$ = fuel-in-air concentration of the above mixture, inversely proportional to the air factor of the given mixture portion.

By substituting all the above values in the mixing formula, we can find that $$\frac{1}{L_T a_t} = \frac{\frac{E-1}{E}V_t \frac{1}{a_1 L_T} + \frac{1}{E}V \frac{1}{a_2 L_T}}{\frac{E-1}{E}V_t + \frac{1}{E}V_t}$$

Consequently, $$\frac{1}{a_t} = \frac{E-1}{E}\frac{1}{a_1} + \frac{1}{E}\frac{1}{a_2}$$

or $$a_t = \frac{E a_1 a_2}{(E-1)a_2 + a_1}$$

The latter formula expresses the relation between the compositions of the mixtures produced by the cylinder and prechamber section of the engine carburetor and the final mixture composition in the prechamber. Neither the prechamber scavenging factor, which might have an effect upon the magnitude of $a_1$, nor the actual compression ratio depending on the spark advance angle, are taken into account in this formula. Calculations as well as experimental tests, however, have proved that these factors have no substantial influence in the above relation.

The prechamber jet ignition method used in the prechamber engine of the present invention has a distinctive feature residing in the fact that the working fuel mixture charge is ignited by a stream of active products of incomplete combustion which are produced in the prechamber by incomplete burning of a rich auxiliary mixture and forced out from the prechamber. Based on the results of extensive experimental research work and on the analysis of the experimental data obtained, the most effective ignition and combustion of the working mixture is achieved by using a resulting air factor of the auxiliary mixture in the prechamber ($a_t$) varying from 0.35 to 0.70.

For these definite values a formula can be obtained, which establishes a relation between the fuel mixture proportions in the carburetor cylinder and prechamber sections 8 and 9 and can be used for their relative adjustment. So, by converting the formula of $a_t$ so as to express $a_2$ in relation to $a_1$, namely:

$$a_2 = \frac{a_1}{\frac{e}{a_t}a_1 - (e-1)}$$

and by substituting $a_t$ in it by definite values from 0.35 to 0.70 and $e$ by a definite compression ratio (7.0, for instance), we obtain the following new relations:

$$a_2 = \frac{a_1}{20a_1 - 6}$$

for $a_t = 0.35$, and $$a_2 = \frac{a_1}{10a_1 - 6}$$

for $a_t = 0.70$.

According to results of experimental research, if the final air factor of the auxiliary mixture in the prechamber ($a_t$) increases twice, from 0.35 to 0.70 and the working mixture air factor ($a_1$) likewise increases twice, from 0.95 or 1.0 at maximum load to 1.8 to 2.0 for light load and idling, the prechamber engine runs evenly and efficiently, showing high economy, performance, anti-knock, and operating characteristics.

The nozzle openings 3 between the prechamber 1 and the main combustion chamber 2 are provided for the purpose of distributing the products of combustion flowing from the prechamber 1 into the main combustion chamber 2 as rapidly and as uniformly as possible and one or more nozzle openings may be provided and disposed in such a manner as to accomplish this result. As shown in FIGS. 1 and 2 of the drawing two nozzle openings 3 may be provided and as shown in FIG. 1, such nozzle openings may be directed at a very slight upward angle and as shown in FIG. 2, the nozzle openings 3 may be disposed at a diverging angle as shown by the dotted lines in order to provide even and rapid distribution of the products of combustion throughout the main combustion chamber 2. It is also to be noted that as shown in FIG. 1, the nozzle openings 3 are located in a position substantially midway of the height of the combustion chamber. It is to be noted that a relatively rich mixture is supplied to the prechamber 1 where such mixture is ignited by the spark plug 4 and the products of combustion of the partially burned rich mixture in the prechamber 1 flow through the nozzle openings 3 into the main combustion chamber 2 and serve to ignite the relatively lean mixture provided in the combustion chamber. This arrangement serves to provide relatively rapid combustion of the main combustion chamber 2 thereby contributing to the high efficiency of the engine.

With the structure above described, the spark plug 4 located in the prechamber 1 is subjected to very severe heat conditions, in that not only is there a high degree of heat developed by combustion of the mixture in the prechamber 1, but upon combustion of the mixture in the main combustion chamber 2, the increase in pressure therein is such that a portion of this burning mixture is forced back into the prechamber 1 which results in severe temperature conditions therein, particularly as regards the electrodes of the spark plug 4.

In order to avoid overheating of the spark plug electrodes and prevent pre-ignition thereby it is to be noted that the spark plug is so positioned that the electrodes thereof are located in the path of flow of fuel mixture entering the prechamber 1 from the intake valve 5 and such fuel mixture serves to cool the spark plug electrode. Also in order to minimize heating of the spark plug electrodes by the burning mixture entering the prechamber 1 from the combustion chamber 2 the deflector or baffle 26 is disposed in such a position as to prevent a direct flow of such burning mixture into contact with the spark plug electrodes and the deflector or baffle 26 may be adequately cooled by subjecting a portion thereof to the cooling fluid circulating in the cooling jacket of the engine. In this manner, the deflector or baffle 26 serves to appreciably cool the hot gases reaching the spark plug electrodes from the main combustion chamber 2.

The design of the intake manifold provides for sufficiently intensive preheating (up to 120° C.) of the prechamber mixture in its passage 21, by virtue of the heat-absorbing fins 22 arranged close to the exhaust manifold 18. A well with an internal pipe is provided in the intake manifold prechamber passages for better uniformity of the prechamber mixture distribution.

Separate cooling of the cylinder head and block ensures keeping up automatically the water temperature in the block, and the oil temperature in the crankcase, at a reasonably high level (90 to 95° C.) irrespectively of the running duration and the loading degree of the engine as well as of the automobile driving speed, for instance.

The improvement of operating characteristics of the prechamber engine consists in reduced heat concentration in the combustion chamber parts, particularly in the exhaust valve, also in better lubrication, reduced oil consumption, and, in prolonged durability, increased wear-resistance of the engine, as well as in elimination of noxious products of incompleted combustion being exhausted into the atmosphere.

All features mentioned above are achieved by accelerating the combustion process and improving the stability of its proceeding, by virtue of application of the prechamber torch ignition method.

It will be obvious to those skilled in the art that various changes may be made in the invention without departing from the spirit and scope thereof and therefore the invention is not limited by that which is shown in the drawing and described in the specification, but only as indicated in the appended claims.

What we claim is:

1. An internal combustion engine including a main combustion chamber, a prechamber, nozzle openings between said prechamber and said main combustion chamber disposed in a manner to rapidly and uniformly distribute chemically active products of incomplete combustion of a rich air fuel mixture with a resulting air factor of 0.4 to 0.7 flowing from said prechamber to said main chamber, a prechamber intake valve, a main chamber intake valve, a spark plug mounted in said prechamber with the electrodes disposed in the path of fuel mixture flowing from said prechamber intake valve, a baffle in said prechamber disposed between said nozzle openings and the electrodes of said spark plugs, water jacket means for cooling said baffle, an intake manifold connected to said main chamber intake valve, an intake passage connected to said prechamber intake valve, an exhaust manifold, means for conducting heat from said exhaust manifold to said intake passage to pre-heat the rich air fuel mixture flowing to said prechamber, a carburetor, a fuel mixing chamber in said carburetor connected to said intake manifold, a second mixing chamber in said carburetor connected to said intake passage, simultaneously operable throttle valves for controlling the flow of fuel mixture to said intake manifold and to said intake passage and a vacuum relief valve connected to said intake manifold, said relief valve comprising a valve member mounted in a valve body, adjustable spring means for urging said valve member toward closed position, a vacuum chamber in said body communicating with said intake manifold, a valve actuating diaphragm connected to said valve member and closing said vacuum chamber and an air passage connected to said valve body, whereby a vacuum above a predetermined value induced in said intake manifold will actuate said diaphragm and valve member to admit air to said intake manifold to reduce the vacuum therein as well as in the main combustion chamber and prechamber to reduce oil consumption and prevent fouling of said spark plug.

2. An internal combustion engine as defined in claim 1, in which the volume of said prechamber is approximately two percent of the volume of said main combustion chamber.

3. An internal combustion engine including a main combustion chamber, a prechamber, nozzle openings between said prechamber and said main combustion chamber disposed in a manner to rapidly and uniformly distribute chemically active products of incomplete combustion of a rich air fuel mixture with a resulting air factor of 0.4 to 0.7 flowing from said prechamber to said main chamber, a prechamber intake valve, a main chamber intake valve, a spark plug mounted in said prechamber with the electrodes disposed in the path of flow of fuel mixture flowing from said prechamber intake valve, a baffle in said prechamber disposed between said nozzle openings and the electrodes of said spark plug, water jacket means for cooling said baffle, an intake manifold connected to said main chamber intake valve, an intake passage connected to said prechamber intake valve, a carburetor, a fuel mixing chamber in said carburetor connected to said intake manifold, a second mixing chamber in said carburetor connected to said intake passage, simultaneously operable throttle valves for controlling the flow of fuel mixture to said intake manifold and to said intake passage and a vacuum relief valve connected to said intake manifold, said relief valve comprising a valve member mounted in a valve body, adjustable spring means for urging said valve member toward closed position, a vacuum chamber in said body communicating with said intake manifold, a valve actuating diaphragm connected to said valve member and closing said vacuum chamber and an air passage connected to said valve body, whereby a vacuum above a predetermined value induced in said intake manifold will actuate said diaphragm and valve member to admit air to said intake manifold to reduce the vacuum therein, as well as in the main combustion chamber and prechamber to reduce oil consumption and prevent fouling of said spark plug.

References Cited in the file of this patent

UNITED STATES PATENTS

| | | |
|---|---|---|
| 1,253,266 | Melton | Jan. 15, 1918 |
| 1,392,364 | Smith | Oct. 4, 1921 |
| 1,568,638 | Summers | Jan. 5, 1926 |
| 1,998,785 | Mock | Apr. 23, 1935 |
| 2,098,875 | Mallory | Nov. 9, 1937 |
| 2,114,655 | Leibing | Apr. 19, 1938 |
| 2,121,920 | Mallory | June 28, 1938 |
| 2,184,357 | Mallory | Dec. 26, 1939 |
| 2,314,175 | Summers | Mar. 6, 1943 |
| 2,699,157 | Heftler et al. | Jan. 11, 1955 |

FOREIGN PATENTS

| | | |
|---|---|---|
| 520,597 | Great Britain | Apr. 29, 1940 |